Aug. 8, 1933.  A. G. HENRIKSON  1,921,082
PIN
Filed June 28, 1932
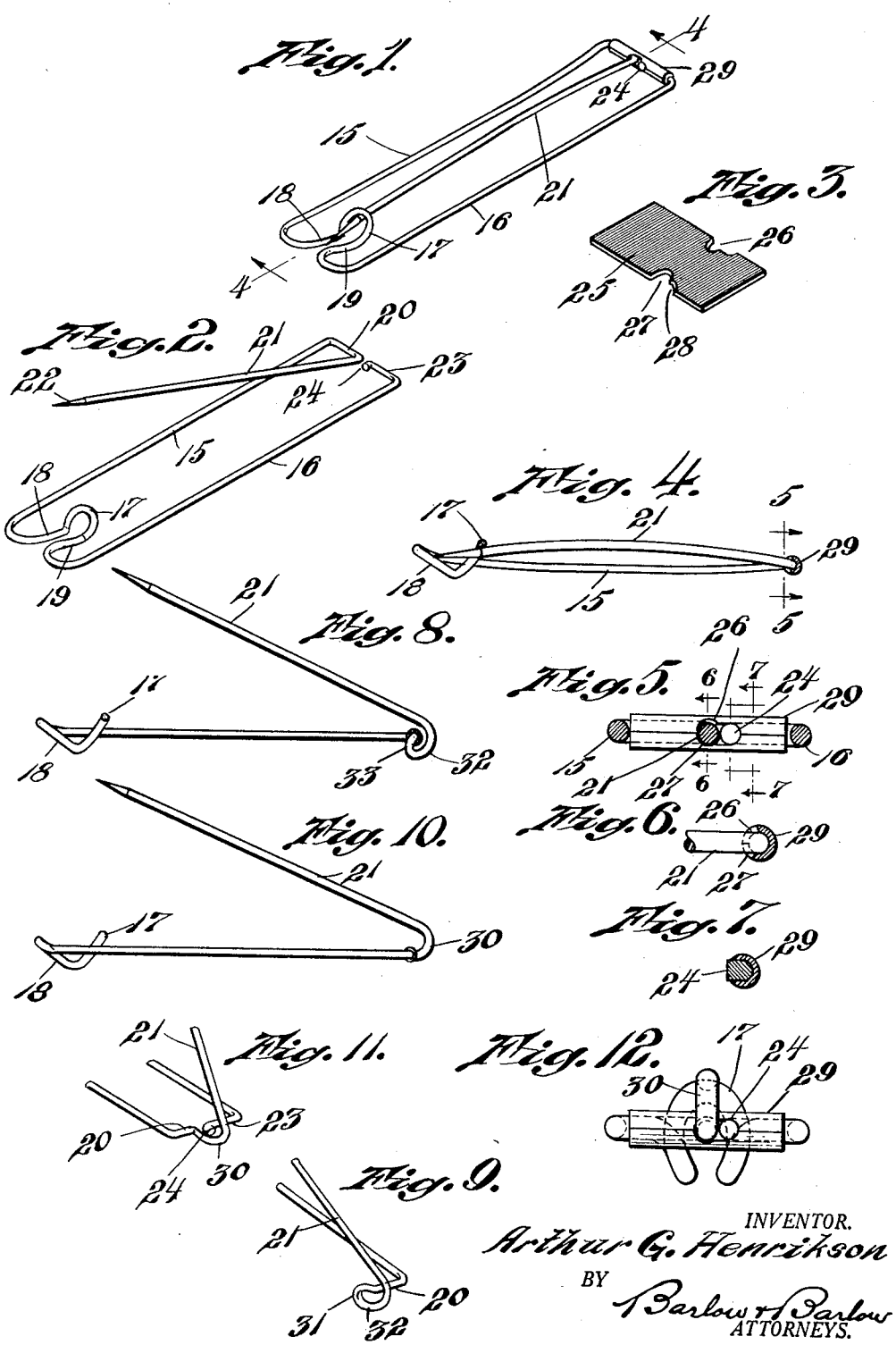
INVENTOR.
Arthur G. Henrikson
BY Barlow & Barlow
ATTORNEYS.

Patented Aug. 8, 1933

1,921,082

UNITED STATES PATENT OFFICE 1,921,082

PIN

Arthur G. Henrikson, Providence, R. I., assignor of one-half to Frank B. Perry, Providence, R. I.

Application June 28, 1932. Serial No. 619,713

7 Claims. (Cl. 24—159)

This invention relates to a pin of the safety pin variety, and has for one of its objects to provide a pin which will lie flat upon the clothing or material with which it engages.

Another object of the invention is the provision of a sleeve member for securing together the portions at the joint end of such a pin in a simple and economical manner.

Another object of the invention is the provision of a sleeve formed from sheet stock so constructed that when folded about the joint end of the pin that it will secure the parts together by reason of a notch or notches in its edge.

Another object of the invention is the provision of a safety pin with the tongue so constructed at its joint end that it will receive a greater thickness of the fabric or material engaged without distortion of the pin.

A further object of the invention is the provision of a construction of pin having a joint end which will permit the pin tongue to be open to a greater extent without bending of the tongue to set or distort the same.

With these and other objects in view, the invention consists of certain novel features of construction, as will be more fully described, and particularly pointed out in the appended claims.

In the accompanying drawing:—

Fig. 1 is a perspective view of the pin in closed position.

Fig. 2 is a perspective view of the pin with its tongue in open position and with the securing sleeve at the joint end removed.

Fig. 3 is a perspective view of the blanked-out securing member.

Fig. 4 is a section on line 4—4 of Fig. 1

Fig. 5 is a sectional view looking at the joint end of the pin and substantially on line 5—5 of Fig. 4

Fig. 6 is a sectional view on substantially line 6—6 of Fig. 5

Fig. 7 is a sectional view on substantially line 7—7 of Fig. 5

Fig. 8 is a similar view to Fig. 4 illustrating a modified form of pin with the tongue provided with a loop at its joint end.

Fig. 9 is a perspective fragmental view of the construction of pin shown in Fig. 8.

Fig. 10 is a side elevation of a still differently modified form of pin.

Fig. 11 is a perspective fragmental view thereof.

Fig. 12 is an end view of the structure shown in Figs. 10 and 11 with the sleeve mounted in securing position.

In the use of safety pins of the type herein disclosed and shown in my co-pending application Ser. No. 600, 145, filed March 21, 1932, it is desirable to provide a pin which will lie flat upon the garment through which it extends, and thus form a less bulky portion, which result is particularly desirable in the use of thin clothing. In such type of pins it is desirable to provide two spaced side bars with a tongue extending between, which bars flex to some extent as the pin tongue flexes in being moved to and from desired position, and in order that a pin of such general shape may be held in position at its joint end, I have provided a sleeve which will embrace the two laterally extending portions of the pin at its joint end with notches to engage the pin tongue and an offset portion or projection to positively prevent lateral spreading of the pin in cases where the sleeve might become slightly loosened or enlarged, and the friction on the laterally extending portion released. I have also provided a pin in which the joint end of the tongue is so formed that it may be opened to a greater extent than where its joint end might lie entirely in the plane of the side bars, which construction also permits of the reception of thicker material without distortion of the pin especially at its joint end; and the following is a detailed description of the present embodiment of this invention illustrating the preferred means by which these advantageous results may be accomplished.

With reference to the drawing, the body portion of the pin consists of side bars 15 and 16 shown here as formed from a single piece of wire bent to provide a catch 17 between the bars at one end of the body. This catch is offset inwardly as illustrated in Fig. 1 to receive the point of the pin tongue between the side portions 18 and 19 of the loop catch 17 to protect the pin point against abraiding the material with which the pin might engage.

The side bar 15 is bent inwardly as at 20 to provide a lateral extending portion which is again bent to provide a pin tongue 21 with a point 22, the same being of a length to engage the catch 17. The side bar 16 is bent inwardly to provide a lateral extending portion 23 and again bent as at 24 to provide a finger or projection which will lie in close adjacency to the tongue 21.

In order that the parts 20 and 23 may be secured together, I have blanked-out a securing member 25 with notches 26 in its opposite edges formed with a large portion 27 and smaller portion 28, which securing member 25 I have folded about portions 20 and 23 to provide a tube 29 embracing these portions with the tongue 21 received in the larger portions 27 of the notches 26 allowing it some flexibility, and the projection 24 received in the portion 28 of these notches. The edge of the notches engage the tongue and projection 24 to prevent lateral spreading of the parts, and the pin is thus maintained with these laterally extending portions 20 and 23 in alignment.

In Fig. 10 instead of bending the pin tongue 21 from the laterally extending portion 20 to extend toward the catch, I have so bent it as at 30 as to extend in the first instance away from the catch and then reversely bend the portion 21 as illustrated in Figs. 10 and 11 to extend toward the catch. In this construction there may be received a thicker fabric or more plies of fabric without distortion of the pin at the joint end. The projection 24 is likewise provided on the laterally extending portion 23, and the tubular sleeve or securing member positioned as above pointed out, the same being shown in the end view of Fig. 12.

In Figs. 8 and 9 I have provided a larger loop 32, as indicated in these figures, than that in Figs. 10, 11 and 12 by initially starting the tongue as at 33 at an angle to the plane of the side bars and thence backwardly and about the laterally extending portion 20 and over the same in a substantially circular coil and thence have extended it in a length to reach the catch for engagement therewith.

In the operation of this pin the side bars 15 and 16 flex throughout their length but primarily at a point about one-third the distance from the joint to the catch end as well as the tongue 21 flexing in its movement. These flexings may be governed by flattening of the tongue or bars to stiffen it at different points, or other similar manipulation as may be readily understood to one skilled in the art.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A pin comprising a length of wire bent to form a body including two side bars bent at one end to provide a catch and bent at the opposite end to provide portions extending toward and in line with each other at one end of the body, a flexible pin tongue extending from one of said portions, said tongue normally lying at an angle to the plane of the side bars and being adapted to be flexed for engagement with said catch, and a cylindrical sleeve member between said side bars and embracing said aligned portions to hold them in desired position.

2. A pin comprising a length of wire bent to form a body including two side bars, a catch connecting said bars at one end, said bars being bent at the other end to provide portions extending toward and in line with each other at one end of the body, a flexible pin tongue extending from one of said portions at an angle to the plane of the side bars, said tongue being adapted to be flexed for engagement with said catch, and a sleeve member embracing said aligned portions to hold them in desired position, said sleeve having an opening through which the pin tongue extends.

3. A pin comprising a length of wire bent to form a body including two side bars bent to provide portions extending toward and in line with each other at one end of the body, a pin tongue extending from one of said portions, and with the other aligned portion bent at its extremity to lie along said pin tongue and a securing member having a notch to receive said pin tongue and the bent extremity and embracing said aligned portions to hold them in desired position.

4. A pin comprising a body having a longitudinally extending side bar with a catch at one end and a laterally extending portion at the other end merging into a pin tongue and comprising a part extending at right angles to said portion and thence bent back across said portion and extending to engage said catch.

5. A pin comprising a body having a longitudinally extending side bar with a catch at one end and a laterally extending portion at the opposite joint end, said portion merging into a pin tongue and comprisig a part extending generally toward said catch ad thence bent back over said portion and of a length to engage said catch.

6. A pin comprising a length of wire bent to form a body including two side bars, a catch and a pin tongue, aligned portions at one end of the side bars and at right angle thereto, and means for maintaining said side bars in parallelism, said means comprising a cylindrical sleeve surrounding the aligned portions and cooperative abutment means on the sleeve and on the aligned portions including said pin tongue.

7. A pin comprising a length of wire bent to form a body including two side bars, a catch connecting the side bars at one end of the body, aligned portions at the opposite end of the body, at right angle to each of the side bars, a pin tongue extending from one of said portions in a direction for engaging said catch, the other of said portions having an upturned end, and a cylindrical sleeve surrounding both of the aligned portions and having an opening therein through which the pin tongue and the aforementioned upturned end extend.

ARTHUR G. HENRIKSON.